United States Patent [19]

Fink et al.

[11] 4,447,498
[45] May 8, 1984

[54] USE OF ORGANOPOLYSILOXANES IN THE MANUFACTURE OF PAPER-COATED PLASTER BOARDS

[75] Inventors: Hans-Ferdi Fink; Götz Koerner; Edmund Luksch, all of Essen, Fed. Rep. of Germany

[73] Assignee: Th.Goldschmidt AG, Essen, Fed. Rep. of Germany

[21] Appl. No.: 445,682

[22] Filed: Dec. 1, 1982

[30] Foreign Application Priority Data

Dec. 16, 1981 [DE] Fed. Rep. of Germany ....... 3149791

[51] Int. Cl.³ ..................... B32B 15/12; B32B 31/12
[52] U.S. Cl. ................... 428/447; 106/287.11; 106/287.12; 106/287.13; 106/287.14; 156/41; 156/44; 162/135; 162/164.4; 427/387; 427/391; 427/393.4; 428/452; 428/703
[58] Field of Search ............... 106/287.11–287.14; 156/41, 44; 162/135, 164.4; 427/387, 391, 393.4; 428/447, 452, 703; 524/588

[56] References Cited

U.S. PATENT DOCUMENTS

| | | | |
|---|---|---|---|
| 3,389,042 | 6/1968 | Bieri et al. | 162/164.4 X |
| 3,431,143 | 3/1969 | Johnson et al. | 528/32 X |
| 3,532,766 | 10/1970 | Leyshon et al. | 524/860 X |
| 3,579,469 | 5/1971 | Grenoble | 524/588 |
| 4,252,933 | 2/1981 | Sumida | 528/31 X |
| 4,258,102 | 3/1981 | Traver et al. | 428/447 X |
| 4,366,286 | 12/1982 | Friemann et al. | 524/588 |
| 4,406,738 | 9/1983 | Fink et al. | 156/41 X |

*Primary Examiner*—Robert A. Dawson
*Attorney, Agent, or Firm*—Toren, McGeady and Stanger

[57] ABSTRACT

Use of an organopolysiloxane having the formula

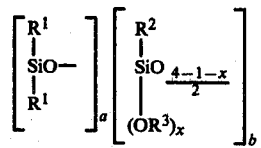

in which
$R^1$ is an alkyl or aryl radical, at least 80% of the $R^1$ radicals being alkyl radicals,
$R^2$ is an alkyl radical or the $R^4Z$ radical, at least ⅔ of the $R^2$ radicals being $R^4Z$ radicals, in which
$R^4$ is a difunctional hydrocarbon radical,
Z is $-NH_2$, $-NH(CH_2)_c-NH_2$, $-NH(CH_2)_cNH(CH_2)_cNH_2$, in which c is 2, 3, $-NHCONH_2$ radical, $-SH$, $-S_4-R^4-Si(OR^3)_3$, $-P(C_6H_5)_2$ or

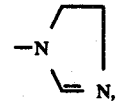

$R^3$ is an alkyl radical with 1 to 4 carbon atoms, or a hydrogen radical,
a is not less than 4,
b/a is not less than 0.001, but not greater than 0.5, and
x is not less than 0.1, but not greater than 2, as a material for decreasing the water absorption of paper which is intended to be used for coating plaster paste in the manufacture of paper-laminated plaster boards. The organosilicon compounds cure without the use of special catalysts. Their aqueous preparations exhibit high stability at use concentrations and are independent of the pH of the paper. The water absorption of papers which are free of aluminum sulfate can also be reduced.

4 Claims, No Drawings

USE OF ORGANOPOLYSILOXANES IN THE MANUFACTURE OF PAPER-COATED PLASTER BOARDS

BACKGROUND OF THE INVENTION

1. Field of the Invention

This invention relates to the field of organosilicon compounds for use in hydrophobizing paper.

2. Description of the Prior Art

Plaster boards, coated on both sides with paper, are frequently used building components. Conventionally, they are manufactured in continuous processes by spreading the plaster paste on a lower paper sheet which is advanced continuously. Subsequently, the surface of the plaster paste is covered with a second paper sheet. This product is molded into flat panels by section rolling and curing at elevated temperatures.

Multi-layer cardboard is generally used as the paper sheet and is produced from waste paper or some other paper pulp feedstock. It is of fundamental importance to obtain a firm bond between the plaster core and the layers of coating paper. Untreated paper soaks up water from the boundary layers of the plaster core and causes the plaster in the core to set with a water ratio different from that of the plaster in the outer regions. This can lead to detachment of the paper layer from the plaster core or to a delamination of the plaster board in its outer regions. These defects, resulting in ineffective products, are described in German Auslegeschrift No. 16 46 765 and U.S. Pat. No. 3,389,042.

Numerous processes have been devised in an attempt to eliminate this defect pattern. All of these processes attempt to reduce the water absorption capacity of the covering paper used. This is generally accomplished by treating the papers with organiosilicon compounds which are fixed on the paper. The degree of reduction of the water absorption of the treated papers can be determined by the Cobb test in accordance with the TAPPI guidelines. The Cobb value represents the difference between the wet and dry weights of a particular sample of paper.

U.S. Pat. No. 4,252,933 discloses providing the surface of paper, rubber, plastic or metal with a non-adhesive, water-repellant, mechanically stressable, and slideably smooth coating which, at the same time, improves the adhesion of other silicones to the surface. This produces a cohesive surface film. This polysiloxane coating consists of (A) an organopolysiloxane with terminal hydroxyl groups and a viscosity of 300 to 10,000,000 cSt at 25° C., and (B) an organopolysiloxane with epoxy groups as well as an aminofunctional silicon compound, in which the amino group is linked to the silicon atom through carbon.

The organopolysiloxane with epoxy groups and the aminofunctional silicon compound are mixed in a quantitative ratio, such that 0.1 to 10 amino groups are present for each epoxy group. It is also possible to replace the mixture with the reaction products. Comparison experiments have shown that the desired effect does not take place in the absence of organopolysiloxanes with epoxy groups. Thus, their presence is absolutely necessary.

Various organosilicon compounds have already been recommended for reducing the water absorption of papers for the manufacture of paper-coated plaster boards. U.S. Pat. No. 3,389,042 discloses the use of curable silicones, such as, epoxy-functional polysiloxanes, methylhydrogensiloxanes, isocyanate-modified silanes and siloxanes, as well as, alkoxysilanes, and siloxanes prepared therefrom for this purpose.

U.S. Pat. No. 3,431,143 discloses the addition of epoxy-functional silicones to paper during its manufacture, the paper so treated, being hydrophobized after curing of the epoxy-functional silicones.

U.S. Pat. No. 4,258,102 discloses silicone preparations consisting of linear or branched polysiloxanols with a viscosity of 500 to 1,000,000 cP at 25° C., and specific amounts of colloidal silica. These preparations are supplied to the paper after its manufacture and are then cured there.

The economical curing of such organosilicon compounds is only possible in the presence of a catalyst. Such a catalyst, however, reduces the storage stability of the silicone preparation. It is also necessary to adjust these preparations to the salt content of the paper, e.g., aluminum sulfate, and to its pH, so that there is no precipitation or gelling on treating the papers.

SUMMARY OF THE INVENTION

We have discovered organosilicon compounds which cure without the use of special curing catalysts. The preparations have a high stability in the concentrations normally used in application and are independent of the pH of the paper. The compounds are effective independently of the salt content of the paper and thus, neutral papers, especially aluminum sulfate-free papers, can also be used.

More particularly, the organosilicon compounds of the present invention have the general formula

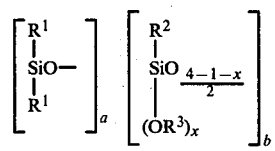

in which $R^1$ is an alkyl or aryl radical, at least 80% of the $R^1$ radicals being alkyl radicals, $R^2$ is an alkyl radical or the $R^4Z$ radical, at least ⅔ of the $R^2$ radicals being $R^4Z$ radicals, and $R^4$ being a bifunctional hydrocarbon radical, Z being $-NH_2$, $-NH(CH_2)_c-NH_2$, $-NH(CH_2)_cNH(CH_2)_cNH_2$ or $-NHCONH_2$ radical, in which c=2 or 3, or the $-SH$, $-S_4-R^4-Si(OR^3)_3$, $-P(C_6H_5)_2$ or

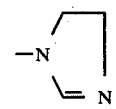

radical, $R^3$ is an alkyl radical with 1 to 4 carbon atoms, or a hydrogen radical, a is not less than 4, b/a is not less than 0.001, but not greater than 0.5, and x is not less than 0.1, but not greater than 2.

The compounds are superior agents for decreasing the water absorption of paper which is intended for covering plaster paste in the manufacture of paper-laminated plaster boards.

DESCRIPTION OF THE PREFERRED EMBODIMENT

Formula I represents the average formula of the organopolysiloxanes. The compounds are present in the form of their polymeric mixtures. The substituents, superscripts, and subscripts may vary in the mixture within the scope of the meanings and limitations shown.

Preferably, $R^1$ represents an alkyl radical with 1 to 4 carbon atoms and the alkyl radicals with 3 to 4 carbon atoms may be branched. Especially preferred is the methyl radical. $R^1$ can also represent an aryl radical, preferably a phenyl radical; however, at least 80% of the $R^1$ radical must be alkyl radicals.

If $R^2$ represents an alkyl radical, the alkyl radicals with 1 to 4 carbon are preferred and the radicals with 3 to 4 carbon atoms can be branched. Especially preferred is the methyl radical.

$R^4$ is preferably an alkylene radical, particularly, the ethylene or propylene radical.

Z is preferably the amine radical or the alkylenediamine or dialkylenetriamine radical.

$R^3$ is preferably the methyl or ethyl radical.

The linear siloxane chain has at least four difunctional siloxy units. Chaim lengths of 10 to 250 siloxy units, and particularly, 20 to 60 siloxy units per block, are preferred.

The number of siloxy units with $OR^3$ radicals is specified by the b/a ratio which is equal to or greater than 0.001. For the minimum value of a=4, this gives a value of 0.004 for b. The value of 0.5 should not be exceeded for b/a so that, when a=4, b has a value of 2. x is greater than zero. A minimum amount of alkoxy or hydroxy groups must therefore be present in the mixture of polymers.

The following structural formulas are examples of compounds within Formula I:

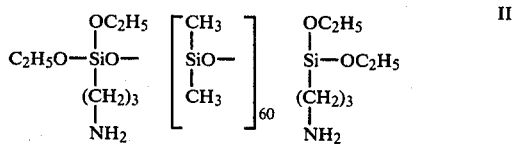

This corresponds to Formula I with
$R^1=CH_3$—; $R^2=$—$(CH_2)_3$—$NH_2$, in which —$(CH_2)_3$—=$R^4$ and —$NH_2=Z$, $R^3=C_2H_5$—; a=60; b=2; b/a=0.033; x=2.

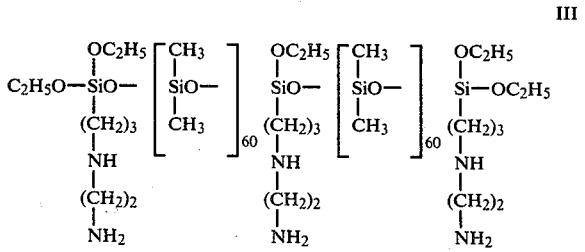

This corresponds to Formula I with
$R^1=CH_3$—; $R^2=$—$(CH_2)_3NH(CH_2)_2NH_2$ with c=2, in which —$(CH_2)_3$—=$R^4$ and —$NH(CH_2)_2NH_2=Z$; $R^3=C_2H_5$; a=120, b=3; b/a=0.025; x=5/3.

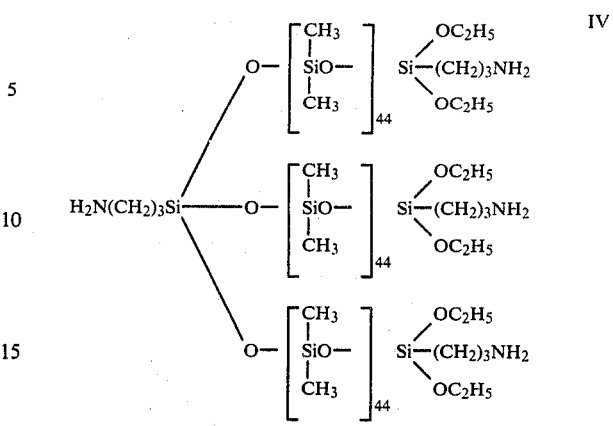

This corresponds to Formula I with
$R^1=CH_3$—; $R^2=$—$(CH_2)_3NH_2$, in which —$(CH_2)_3$—=$R^4$ and —$NH_2=Z$; $R^3=C_2H_5$; a=132; b=4; b/a=0.03; x=1.5.

The organosilicon compounds for use in accordance with the invention can be synthesized by methods known to those skilled in the art. In this connection, the following synthesis procedures are appropriate: a,ω-siloxanols of the formula

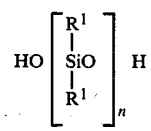

in which n is a whole number not less than 4, are reacted with silanes of the general formula $R^2Si(OR^3)_3$, optionally in the presence of organic solvents, such as, for example, toluene, with partial splitting off of the $R^3OH$ alcohol.

The reaction is preferably carried out in a quantitative ratio, such that at least 1.1 to 3 $OR^3$ groups of the silane correspond to one SiOH group of the polysiloxanol.

The reaction is preferably carried out at elevated temperatures, for example, at the boiling point of the solvent or, if no solvent is used, at temperatures of at least 150° C.

A further possibility for synthesizing the organosilicon compounds of the present invention is equilibrating cyclic siloxanes with the aforementioned silanes in the presence of generally known equilibrium catalysts, such as, inorganic or organic acids or alkaline catalysts, at temperatures from 60° to 100° C. Solvents may be used but are not absolutely necessary.

The organosilicon compounds synthesized according to this process can be emulsified in the form of an aqueous emulsion, or of an oil/water type emulsion with the help of conventional emulsifiers. Examples of such emulsifiers are: nonionic emulsifiers, such as, the addition products of ethylene oxide on compounds with acidic hydrogens, e.g., fatty alcohols or alcohols of the oxo synthesis; anionic emulsifiers, such as, for example, the amine salts of alkylbenzenesulfonic acids; cationic emulsifiers, such as, for example, dimethyldidecylammonium chloride, or dimethylstearylbenzylammonium chloride. In the usual case, the emulsifiers are used in an amount of 2 to 10%, based on the organosilicon compounds to be emulsified. The emulsification itself is carried out by known procedures, for example, by mixing the organosilicon compounds and the emulsifier and slowly stirring in water, or by first emulsifying the organosilicon compounds in a concentrated aqueous solution or dispersion of the emulsifier and diluting the pre-emulsion obtained with water. The emulsions can also be homogenized by using a high-shear stirrer.

It is also possible to synthesize the organosilicon compounds in such a manner, that emulsions are obtained directly. This can be accomplished by emulsion polymerization.

The emulsion polymerization is carried out in the presence of acidic or basic catalysts, for example, dodecylbenzenesulfonic acid, potassium hydroxide, or dimethyldidecylammonium hydroxide. For this purpose, the reaction is preferably carried out in the temperature range of 90° to 95° C. The use of solvents is possible, but not absolutely necessary.

Siloxanes, which contain aminoalkyl groups, are known from U.S. Pat. Nos. 3,460,981, 3,503,933 and 3,836,371. They are used for sizing fiberglass. However, the synthesis described therein can be used.

The organosilicon compounds of the present invention are advisably marketed in a highly concentrated emulsion or dispersion, the concentration of organosilicon compounds in the preparations depending essentially on the stability of the emulsions. It is entirely possible to sell compounds which contain 50 weight percent of the organosilicon compounds. However, these concentrated emulsions are diluted when used for the purpose of decreasing the water absorption of paper in the manufacture of structural plaster panels. The degree of dilution depends primarily on the amount of organosilicon compounds, which is to be applied on the paper. It is, for example, possible to dilute the commercial form of the material to an application concentration of about 1% of active substance.

It is a purpose of the present invention to reduce the water absorption of the paper for the manufacture of structural plaster panels by the applications of preferably about 150 to 300 mg of polysiloxane per m² of paper, the optimum amount being determined advisably by preliminary experiments. The inventive polysiloxane can be added during the manufacture of the paper or on the finished paper. If the dilute aqueous preparation is added during the manufacturing process of the paper, it is advisably added during the drying stage, after the consolidating paper has already lost the bulk of its water.

If additional paper pulp is added to partially dewatered paper in the manufacture of cardboard, it may be adequate to add the aqueous preparation of the organosilicon compound only to that layer of the paper, which will be in direct contact with the plaster paste in later use.

The preparation can also be applied to the finished paper. For this purpose, the stock emulsion or a slightly diluted stock emulsion is advisably used directly and applied with a metered roller application or a doctor blade system to the paper. It is, however, also possible to spray dilute preparations onto the paper.

The curing of the inventive organopolysiloxane starts during and after the drying of the paper, the curing time depending on the temperature. At temperatures of about 150° C., curing is finished after about 15 minutes. On the other hand, if the treated paper is allowed to stand at room temperature, after about three days, curing has progressed so far, that the paper can be used for its intended purpose.

It is a particular advantage of the polysiloxanes selected that they can be employed without any addition of hardener and especially, that papers can be used which are free of aluminum sulfate. The impregnated papers permit the defect-free manufacture of structural plaster boards without striations and delaminations. The papers are not distorted on contact with the moist plaster paste. A plane surface is obtained and retained.

The synthesis of the inventive compounds and the use of these compounds in the impregnation of papers for the manufacture of plaster boards is shown in the following examples.

EXAMPLE 1

In a reactor equipped with stirrer, distillation bridge and thermometer, 3775 parts by weight of an α,ω-dihydroxypolydimethylsiloxane, with a hydroxyl content of 0.9 weight percent, and 442.8 parts by weight of γ-aminopropyltriethoxysilane are mixed and heated to 170° C. After 2 hours, 90.5 parts by weight of ethanol has been distilled off. Based on the hydroxyl groups, this amount corresponds to a conversion of 98.2%.

An average formula of

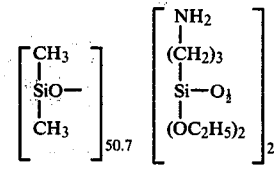

is calculated from the formulation. The product has an $OC_2H_5$ content of 4.4 weight percent and a viscosity of 156 mm²·sec⁻¹ at 25° C.

An emulsion with a 50% siloxane content is prepared by the following method from this active ingredient:

50.0 parts by weight of the siloxane are mixed with
2.0 parts by weight of an ethoxylated fatty alcohol with an HLB of 11.4; and
3.0 parts by weight of an ethoxylated natural triglyceride with an HLB of 17.5;

The mixture is heated to 60° C.

Water, 45.0 parts by weight, is stirred into this mixture in portions. The pre-emulsion obtained is homogenized in a gap-type homogenizer (Manton Gaulin) at about 150 bar.

The procedure below is followed in order to determine the water-absorption reducing effect of the inventive siloxanes, which are used for the manufacture of cardboard for plaster cardboard panels.

A section of cardboard, 20 cm wide, 30 cm long, and weighing 153.5 g/m², is coated by scraping on a dilute emulsion containing 1 weight percent of the inventive siloxane. The doctor blade is so adjusted that the amount of siloxane applied is 200 to 250 mg/m². The moist cardboard so coated, is then dried for 15 minutes at 150° C., and subsequently conditioned for 4 hours at 20° C., and a relative humidity of 65%.

The water absorption of the cardboard so treated is determined in the following manner: The equipment used for the measurement consists of a base plate and a steel ring which can be depressed onto the base plate. The steel ring has an open surface area of 100 cm². The weighed section of cardboard is firmly clamped between the base plate and the ring. The area of the cardboard section, enclosed by the ring, is covered with 100 ml of water at 20° C. After 1 minute, the supernatant water is removed quantitatively. The section of cardboard is taken from the measuring device and weighed. The water absorption in g/cm² (the so-called Cobb value) is calculated from the difference in weight. Under these conditions, untreated cardboard has a water absorption of 113 g/m². The cardboard section, treated with the inventive siloxane, has a water absorption of only 17.8 g/m².

EXAMPLE 2

The following active substances were prepared by the method described in Example 1.

TABLE 1

| | General Formula | | Indices | Silicone Coating in mg/m² | Water Absorption in g/m² |
|---|---|---|---|---|---|
| a | $\left[\begin{array}{c} CH_3 \\ | \\ SiO- \\ | \\ CH_3 \end{array}\right]_a$ | $\left[\begin{array}{c} NH_2 \\ | \\ C_3H_6 \\ | \\ Si(OC_2H_5)_x \\ | \\ O_{\frac{4-1-x}{2}} \end{array}\right]_b$ | a = 102<br>b = 3<br>x = 1.67 | 198 | 21.6 |
| b | like a | | a = 510<br>b = 11<br>x = 1.18 | 192 | 22.9 |
| c | like a | | a = 917<br>b = 2<br>x = 2 | 205 | 21.7 |
| d | $\left[\begin{array}{c} CH_3 \\ | \\ SiO- \\ | \\ CH_3 \end{array}\right]_a$ | $\left[\begin{array}{c} NH-C_2H_4NH_2 \\ | \\ C_3H_6 \\ | \\ Si(OCH_3)_x \\ | \\ O_{\frac{4-1-x}{2}} \end{array}\right]_b$ | a = 70.8<br>b = 2<br>x = 2 | 215 | 26.8 |
| e | $\left[\begin{array}{c} CH_3 \\ | \\ SiO- \\ | \\ CH_3 \end{array}\right]_a$ | $\left[\begin{array}{c} SH \\ | \\ C_3H_6 \\ | \\ Si(OCH_3)_x \\ | \\ O_{\frac{4-1-x}{2}} \end{array}\right]_b$ | a = 153<br>b = 4<br>x = 1.5 | 235 | 18.5 |
| f | $\left[\begin{array}{c} CH_3 \\ | \\ SiO- \\ | \\ CH_3 \end{array}\right]_a$ | $\left[\begin{array}{c} P(C_6H_5)_2 \\ | \\ C_2H_4 \\ | \\ Si(OC_2H_5)_x \\ | \\ O_{\frac{4-1-x}{2}} \end{array}\right]_b$ | a = 210<br>b = 4<br>x = 1.5 | 205 | 26.1 |

EXAMPLE 3

To a solution of 20.3 parts by weight of didecyldimethylammonium chloride and 13.4 parts by weight of dialkyldimethylammonium chloride (the alkyl radical is derived from hydrogenated tallow) in 707 g of water, 13.4 g of a potassium hydroxide solution is added and the mixture is heated to 95° C. While stirring vigorously, 237.3 g (0.8 moles) of octamethylcyclotetrasiloxane are added dropwise during 75 minutes. Subsequently, 8.7 g (0.04 moles) of γ-aminopropyltriethoxysilane are added dropwise during 15 minutes. Stirring is continued for 1 hour at 95° C. The mixture is subsequently cooled at 30° C. and the potassium hydroxide added is neutralized with acetic acid. The resultant transparent finely divided emulsion contains a siloxane of the average formula

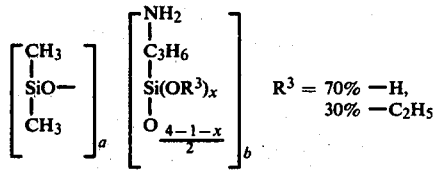

$R^3 = 70\% \ -H,\ 30\% \ -C_2H_5$ in which a=40, b=2, x=2.

The inventive siloxane is tested by the method described in Example 1. The water absorption of a cardboard coated with 230 mg of siloxane/m² is 20.4 g.

Further trials are carried out with siloxanes whose formulas (products (g) to (k)) are given in Table 2. Table 2 furthermore contains the water absorption value of cardboard treated with the inventive siloxane.

TABLE 2

| | General Formula | | Indices | Silicone Coating in mg/m² | Water Absorption in g/m² |
|---|---|---|---|---|---|
| g | $\left[\begin{array}{c} CH_3 \\ | \\ SiO- \\ | \\ CH_3 \end{array}\right]_a$ | $\left[\begin{array}{c} C_3H_6-NH_2 \\ | \\ Si-(OR^3)_x \\ | \\ O_{\frac{4-1-x}{2}} \end{array}\right]_b$ | a = 19<br>b = 2<br>x = 2 | 220 | 24.2 |
| h | $\left[\begin{array}{c} CH_3 \\ | \\ SiO- \\ | \\ CH_3 \end{array}\right]_a$ | $\left[\begin{array}{c} C_3H_6NHC_2H_4NHC_2H_4NH_2 \\ | \\ Si-(OR^3)_x \\ | \\ O_{\frac{4-1-x}{2}} \end{array}\right]_b$ | a = 40<br>b = 2<br>x = 2 | 230 | 22.3 |

TABLE 2-continued

| General Formula | Indices | Silicone Coating in mg/m² | Water Absorption in g/m² |
|---|---|---|---|
| i $\left[\begin{array}{c}CH_3\\|\\SiO-\\|\\CH_3\end{array}\right]_a \left[\begin{array}{c}C_3H_6NH-\overset{O}{\underset{\|}{C}}-NH_2\\|\\Si-(OR^3)_x\\|\\O_{\frac{4-1-x}{2}}\end{array}\right]_b$ | a = 40<br>b = 2<br>x = 2 | 232 | 21.1 |
| k $\left[\begin{array}{c}CH_3\\|\\SiO-\\|\\CH_3\end{array}\right]_a \left[\begin{array}{c}C_3H_6N\overset{\displaystyle\frown}{\phantom{xx}}N\\|\\Si-(OR^3)_x\\|\\O_{\frac{4-1-x}{2}}\end{array}\right]_b$ | a = 40<br>b = 2<br>x = 2 | 215 | 22.3 |

We claim:

1. In a method for decreasing the water absorption of paper wherein paper is treated with a hydrophobizing agent which is then cured, the improvement which comprises said agent being an organopolysiloxane having the formula

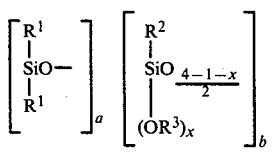

in which
R¹ is an alkyl or aryl radical, at least 80% of the R¹ radicals being alkyl radicals,
R² is an alkyl radical or the R⁴Z radical, at least ⅔ of the R² radicals being R⁴Z radicals, in which
R⁴ is a difunctional hydrocarbon radical,
Z is —NH₂, —NH(CH₂)$_c$—NH₂, —NH(CH₂)$_c$NH(CH₂)$_c$NH₂, in which c is 2, 3, —NHCONH₂ radical, —SH, —S₄—R⁴—Si(OR³)₃, —P(C₆H₅)₂ or

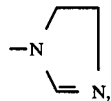

R³ is an alkyl radical with 1 to 4 carbon atoms, or a hydrogen radical,
a is not less than 4,
b/a is not less than 0.001, but not greater than 0.5, and
x is not less than 0.1, but not greater than 2.

2. In a process for the preparation of paperlaminated plaster boards wherein plaster paste is spread on a lower paper sheet and the surface of the paste layer is covered with a second paper sheet, the laminate is molded into flat panels and cured at elevated temperatures, the improvement which comprises first treating the paper sheets with a hydrophobizing agent to decrease the water absorbency of the paper, the agent being an an organopolysiloxane having the formula

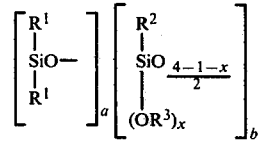

in which
R¹ is an alkyl or aryl radical, at least 80% of the R¹ radicals being alkyl radicals,
R² is an alkyl radical or the R⁴Z radical, at least ⅔ of the R² radicals being R⁴Z radicals, in which
R⁴ is a difunctional hydrocarbon radical,
Z is —NH₂, —NH(CH₂)$_c$—NH₂, —NH(CH₂)$_c$NH(CH₂)$_c$NH₂, in which c is 2, 3, —NHCONH₂ radical, —SH, —S₄—R⁴—Si(OR³)₃, —P(C₆H₅)₂ or

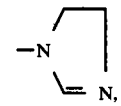

R³ is an alkyl radical with 1 to 4 carbon atoms, or a hydrogen radical,
a is not less than 4,
b/a is not less than 0.001, but not greater than 0.5, and
x is not less than 0.1, but not greater than 2, and then subjecting the treated paper to curing conditions.

3. Paper produced by the process of claim 1.

4. Paper-laminated plaster board produced by the process of claim 2.

* * * * *